(12) United States Patent
Shida et al.

(10) Patent No.: US 8,530,023 B2
(45) Date of Patent: Sep. 10, 2013

(54) OPTICAL INFORMATION RECORDING MEDIUM AND SPUTTERING TARGET FOR FORMING REFLECTIVE FILM FOR OPTICAL INFORMATION RECORDING MEDIUM

(75) Inventors: Yoko Shida, Kobe (JP); Yuuki Tauchi, Kobe (JP)

(73) Assignee: Kobe Steel, Ltd., Kobe-shi (JP)

( * ) Notice: Subject to any disclaimer, the term of this patent is extended or adjusted under 35 U.S.C. 154(b) by 16 days.

(21) Appl. No.: 13/257,767

(22) PCT Filed: Apr. 14, 2010

(86) PCT No.: PCT/JP2010/056660
§ 371 (c)(1),
(2), (4) Date: Sep. 20, 2011

(87) PCT Pub. No.: WO2010/119888
PCT Pub. Date: Oct. 21, 2010

(65) Prior Publication Data
US 2012/0009430 A1      Jan. 12, 2012

(30) Foreign Application Priority Data

Apr. 14, 2009 (JP) ................. 2009-098283
Apr. 14, 2009 (JP) ................. 2009-098284

(51) Int. Cl.
*G11B 7/24* (2006.01)
(52) U.S. Cl.
USPC .............. 428/64.1; 428/64.4; 430/270.12
(58) Field of Classification Search
USPC ................ 428/64.4; 430/270.12
See application file for complete search history.

(56) References Cited

U.S. PATENT DOCUMENTS

| | | |
|---|---|---|
| 5,948,497 A | 9/1999 | Hatwar et al. |
| 6,007,889 A | 12/1999 | Nee |
| 6,229,785 B1 | 5/2001 | Kitaura et al. |
| 6,280,811 B1 | 8/2001 | Nee |
| 6,451,402 B1 | 9/2002 | Nee |
| 6,689,444 B2 | 2/2004 | Nakai et al. |
| 6,788,635 B1 | 9/2004 | Aratani et al. |
| 7,022,384 B2 | 4/2006 | Fujii et al. |

(Continued)

FOREIGN PATENT DOCUMENTS

| | | |
|---|---|---|
| JP | 2-267752 | 11/1990 |
| JP | 3-252929 | 11/1991 |

(Continued)

OTHER PUBLICATIONS

International Search Report issued Jul. 20, 2010, in Patent Application No. PCT/JP2010/056660.

(Continued)

*Primary Examiner* — Elizabeth Mulvaney
(74) *Attorney, Agent, or Firm* — Oblon, Spivak, McClelland, Maier & Neustadt, L.L.P.

(57) ABSTRACT

Disclosed is a read-only optical information recording medium which comprises a reflective film having a reflectance suitable for use as a reflective film for an optical information recording medium (e.g., BD-ROM) and having excellent reproduction stability, and which utilizes a blue laser beam. Specifically disclosed is a read-only optical information recording medium comprising a reflective film, wherein the reflective film comprises an Al-based alloy containing at least one element selected from Si and Ge in an amount of 5 to 40 at. %.

20 Claims, 1 Drawing Sheet

(56) References Cited

U.S. PATENT DOCUMENTS

| | | |
|---|---|---|
| 7,203,003 B2 | 4/2007 | Nakai et al. |
| 7,419,711 B2 | 9/2008 | Tauchi et al. |
| 7,452,604 B2 | 11/2008 | Takagi et al. |
| 7,476,431 B2 | 1/2009 | Tauchi et al. |
| 7,507,458 B2 | 3/2009 | Takagi et al. |
| 7,514,037 B2 | 4/2009 | Tauchi et al. |
| 7,517,575 B2 | 4/2009 | Fujii et al. |
| 7,566,417 B2 | 7/2009 | Tauchi et al. |
| 7,695,790 B2 | 4/2010 | Tauchi et al. |
| 7,695,792 B2 | 4/2010 | Tauchi et al. |
| 7,704,581 B2 | 4/2010 | Takagi et al. |
| 7,713,608 B2 | 5/2010 | Nakai et al. |
| 7,722,942 B2 | 5/2010 | Tauchi et al. |
| 7,754,307 B2 | 7/2010 | Tauchi et al. |
| 7,758,942 B2 | 7/2010 | Tauchi et al. |
| 7,767,041 B2 | 8/2010 | Takagi et al. |
| 7,776,420 B2 | 8/2010 | Tauchi et al. |
| 7,790,263 B2 | 9/2010 | Nakano et al. |
| 7,803,444 B2 * | 9/2010 | Miki et al. .................. 428/64.1 |
| 7,833,604 B2 | 11/2010 | Tsubota et al. |
| 7,843,796 B2 | 11/2010 | Sakamoto et al. |
| 7,871,686 B2 | 1/2011 | Tauchi et al. |
| 2002/0034603 A1 | 3/2002 | Nee |
| 2002/0122913 A1 | 9/2002 | Nee |
| 2003/0138591 A1 | 7/2003 | Nee |
| 2003/0215598 A1 | 11/2003 | Nee |
| 2004/0018334 A1 | 1/2004 | Nee |
| 2004/0148623 A1 | 7/2004 | Rijpers et al. |
| 2004/0151866 A1 | 8/2004 | Nee |
| 2004/0151867 A1 | 8/2004 | Nee |
| 2004/0191463 A1 | 9/2004 | Nee |
| 2004/0238356 A1 | 12/2004 | Matsuzaki et al. |
| 2004/0258872 A1 | 12/2004 | Nee |
| 2005/0042406 A1 | 2/2005 | Nee |
| 2005/0112019 A1 | 5/2005 | Nakai et al. |
| 2005/0153162 A1 | 7/2005 | Takagi et al. |
| 2005/0170134 A1 | 8/2005 | Nee |
| 2006/0171842 A1 | 8/2006 | Tauchi et al. |
| 2006/0177768 A1 | 8/2006 | Tauchi et al. |
| 2008/0075910 A1 | 3/2008 | Ohwaki et al. |
| 2009/0057140 A1 | 3/2009 | Takagi et al. |
| 2009/0057141 A1 | 3/2009 | Tauchi et al. |
| 2009/0139860 A1 | 6/2009 | Matsuzaki |
| 2010/0020668 A1 | 1/2010 | Narumi et al. |
| 2010/0038233 A1 | 2/2010 | Takagi et al. |
| 2010/0065425 A1 | 3/2010 | Matsuzaki et al. |
| 2010/0074094 A1 | 3/2010 | Sakamoto et al. |
| 2010/0202280 A1 | 8/2010 | Nakai et al. |
| 2010/0226240 A1 | 9/2010 | Jiko et al. |
| 2011/0003168 A1 | 1/2011 | Jiko et al. |
| 2011/0042135 A1 | 2/2011 | Tauchi et al. |
| 2011/0165016 A1 | 7/2011 | Jiko et al. |
| 2011/0222392 A1 | 9/2011 | Tauchi et al. |

FOREIGN PATENT DOCUMENTS

| | | |
|---|---|---|
| JP | 4-28032 | 1/1992 |
| JP | 4-252440 | 9/1992 |
| JP | 5-258363 | 10/1993 |
| JP | 6-208732 | 7/1994 |
| JP | 6-223412 | 8/1994 |
| JP | 6-302027 | 10/1994 |
| JP | 2000-57627 | 2/2000 |
| JP | 2001-184725 | 7/2001 |
| JP | 2002-74752 | 3/2002 |
| JP | 2003-160826 | 6/2003 |
| JP | 2004-158145 | 6/2004 |
| JP | 2004-171631 | 6/2004 |
| JP | 2004-528674 | 9/2004 |
| JP | 2005-158236 | 6/2005 |
| JP | 2006-240289 | 9/2006 |
| JP | 2009-20919 | 1/2009 |
| KR | 2001-0075247 | 8/2001 |
| WO | WO 98/09823 | 3/1998 |
| WO | WO 01/08145 A1 | 2/2001 |

OTHER PUBLICATIONS

Office Action issued on Jul. 20, 2010 in the corresponding Japanese Patent Application No. 2009-098284 (with English Translation).

Korean Office Action issued Oct. 25, 2012, in Korea Patent Application No. 10-2011-7023874 (with English translation).

\* cited by examiner

OPTICAL INFORMATION RECORDING MEDIUM AND SPUTTERING TARGET FOR FORMING REFLECTIVE FILM FOR OPTICAL INFORMATION RECORDING MEDIUM

CROSS REFERENCE TO RELATED APPLICATION

This application is a 371 of PCT/JP2010/056660, filed on Apr. 14, 2010, and claims priority to the following Japanese Patent Applications: 2009-098283, filed on Apr. 14, 2009; and 2009-098284, filed on Apr. 14, 2009.

TECHNICAL FIELD

The present invention relates to an optical information recording medium such as a read-only BD (blue-ray disc) which uses, for example, a blue laser for reproduction, and also relates to a sputtering target for forming a reflective film for the optical information recording medium.

BACKGROUND ART

Optical information recording media (optical discs) are roughly classified, based on the recording/reproduction principles, into the three types: a read-only type, a write-once type, and a rewritable type.

FIG. 1 schematically shows a typical configuration of a read-only optical information recording medium (single-layer optical disc). As shown in FIG. 1, a read-only optical information recording medium has a structure including a reflective film 2 composed of Ag, Al, or Au as a main component and a light-transmitting layer 3 which are laminated in order on a substrate 1 composed of a transparent plastic. The substrate 1 includes, for example, a polycarbonate substrate having a thickness of 1.1 mm and a diameter of 12 cm, on which information is recorded by using combinations of bumps and indentations called "lands" and "pits", respectively. The light-transmitting layer 3 is formed by, for example, bonding a light-transmitting sheet or applying and curing a light-transmitting resin. Recorded data is reproduced by detecting a phase difference or reflection difference of a laser beam applied to an optical disc.

FIG. 1 shows the single-layer optical disc including a layer each of the reflective film 2 and the light-transmitting layer 3 formed on the substrate on which information is recorded by using combinations of lands and pits (recorded data). However, a dual-layer optical disc including a first information recording surface 11 and a second information recording surface 12 as shown in FIG. 2 is also used. In detail, the dual-layer optical disc shown in FIG. 2 has a configuration in which a first reflective film 2A, a first light-transmitting layer 3A, a second reflective film 2B, and a second light-transmitting layer 3B are sequentially laminated on a substrate 1 on which information is recorded by using bumps and indentations referred to as "lands" and "pits", respectively (recorded data), the information recorded by combinations of the lands and pits in the first light-transmitting layer 3A being different from that recorded on the substrate 1.

For the reflective film used for the optical disc, Au, Cu, Ag, Al, and an alloy containing two or more of these elements as a main component have been widely used.

Among these, a reflective film composed of Au as a main component has the advantages of excellent chemical stability and little change in recording characteristics with time. However, this reflective film is expensive and has the problem that sufficiently high reflectance cannot be obtained for a blue laser (wavelength 405 nm) used for recording/reproduction in BD. In addition, a reflective film composed of Cu as a main component is inexpensive but has the disadvantages of lowest chemical stability among conventional reflective film materials and low reflectance for a blue laser like in the case of Au, thereby causing a limit to application. On the other hand, a reflective film composed of Ag as a main component shows sufficiently high reflectance in the range of 400 to 800 nm, which is a practical wavelength range, and has high chemical stability, and is thus, at present, widely used for optical discs using blue lasers.

Although Al shows sufficiently high reflectance at a wavelength of 405 nm and is more inexpensive than Ag and Au, an Al-base film has lower chemical stability than an Ag-based or Au-based reflective film. Therefore, in order to secure durability, it is necessary to sufficiently increase the thickness of the reflective film, and, for example, in DVD-ROM, the thickness of the Al-based reflective film is sufficiently increased. However, in BD-ROM (read-only blue-ray disc) using a blue laser, increasing the thickness of the Al-based reflective film as in conventional discs has the problem of decreasing the precision of recorded signals (reproduced signals) (i.e., increasing a jitter value), thereby failing to achieve stable reproduction. There is also the problem that although the reflective film has excellent characteristics (initial reflectance and initial jitter value) immediately after formation, these characteristics deteriorate during long-term storage at high temperature and high humidity. Therefore, the reflective film preferably further has excellent durability.

As a technique using an Al-based alloy for a reflective film for an optical disc, for example, Patent Literature 1 discloses an optical information recording medium using, for a reflective film, an Al alloy containing a least one of Ge, Ti, Ni, Si, Tb, Fe, and Ag as an additive element.

However, Patent Literature 1 relates to a technique on the assumption that it is applied to DVD, and thus, for example, when this technique is applied to the BD-ROM, it is considered to be necessary that stable reproduction is realized by increasing the accuracy of recorded signals.

PATENT LITERATURE

PTL 1: International Publication No. 01/008145

TECHNICAL PROBLEM

The present invention has been achieved in consideration of the above-described situation, and an object of the present invention is to provide an optical information recording medium including a reflective film which exhibits disc reflectance suitable for a reflective film for an optical information recording medium (for example, BD-ROM) and which has excellent reproduction stability and, more preferably, further have excellent durability, and to provide a sputtering target useful for forming the reflective film.

SOLUTION TO PROBLEM

The present invention includes the following embodiments.

(1) A read-only optical information recording medium including a reflective film, wherein the reflective film is composed of an Al-based alloy containing 5 to 40% ("%" for the component represents "atomic %" unless otherwise specified, and when Si and Ge are contained, the value represents a total amount, the same applying hereinafter) of at least one of Si and Ge.

(2) The read-only optical information recording medium described in (1), further containing 0.7 to 5% (when two or more elements are contained, the value represents a total amount, the same applying hereinafter) of at least one of a refractory metal element and a rare-earth element.

(3) The read-only optical information recording medium described in (2), wherein the refractory metal element is at least one element selected from the group consisting of Ti, Fe, Mn, Ta, W, Mo, Cr, V, Zr, Nb, and Hf.

(4) The read-only optical information recording medium described in (2), wherein the rare-earth element is at least one of Nd and Y.

(5) The read-only optical information recording medium described in any one of (1) to (4), including a structure in which the reflective film and a light-transmitting layer are laminated on a substrate, wherein information is reproduced with a blue laser.

(6) A sputtering target for forming a reflective film used for the optical information recording medium described in (1), the target being composed of an Al-based alloy containing 5 to 40% of at least one of Si and Ge.

(7) A sputtering target for forming a reflective film used for the optical information recording medium described in (2), the target being composed of an Al-based alloy containing 5 to 40% of at least one of Si and Ge and 0.7 to 5% of at least one of a refractory metal element and a rare-earth element.

(8) The sputtering target described in (7), wherein the refractory metal element is at least one element selected from the group consisting of Ti, Fe, Mn, Ta, W, Mo, Cr, V, Zr, Nb, and Hf.

(9) The sputtering target described in (7), wherein the rare-earth element is at least one of Nd and Y.

ADVANTAGEOUS EFFECTS OF INVENTION

According to the present invention, it is possible to realize a reflective film exhibiting suitable reflectance as a reflective film for an optical information recording medium (for example, BD-ROM) and having excellent reproduction stability. Also, when a proper amount of at least one of a refractory metal element and a rare-earth element is added, it is possible to realize a reflective film further having excellent durability for maintaining these characteristics even in long-term storage at a high temperature and high humidity. Therefore, it is possible to provide a read-only optical information recording medium with suppressed manufacturing cost as compared with an optical information recording medium using a conventional Ag alloy for a reflective film.

The optical information recording medium of the present invention is particularly suitably used for an optical information recording medium such as BD-ROM which uses a blue laser for reproduction.

In the present invention, the term "suitable reflectance" represents that an initial reflectance measured by a method described in Examples below falls in the range of 40% or more and 75% or less. The lower limit of the initial reflectance is preferably 50%. On the other hand, the upper limit is preferably 65% and more preferably less than 60% from the viewpoint of easily achieving an initial jitter value described below.

The term "excellent reproduction stability" represents that the initial jitter value measured by a method described in the examples below is 6.5% or less.

The term "excellent durability" represents that in an accelerated environmental test of holding a sample for 96 hours in the environments of a temperature of 80° C. and a relative humidity of about 85% as described in the examples below, a change in reflectance before and after the accelerated environmental test is within ±5%, and both jitter values before and after the accelerated environmental test are 6.5% or less.

DESCRIPTION OF EMBODIMENTS

Figure 1:
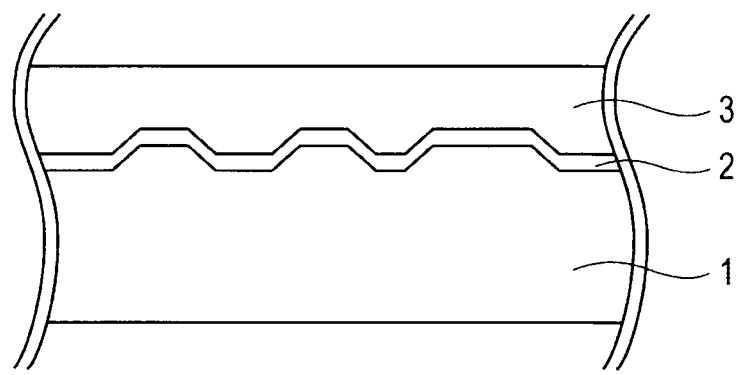
FIG. 1 is a sectional view schematically showing a principal portion of a read-only optical information recording medium (single-layer optical disc) in the circumferential direction.

In order to achieve the above-described object, the inventors of the present invention researched, from various angles, Al-based alloys suitable as materials for reflective films which exhibit suitable reflectance for a reflective film for, particularly, an optical information recording medium (for example, BD-ROM) and exhibits excellent reproduction stability and preferably further exhibits excellent durability.

Specifically, first, by using Al-based alloys containing various alloy elements described in Patent Literature 1 etc., the effects of the alloy elements on reflectance and reproduction stability and further on durability were studied in detail. More specifically, each of various Al alloy films was formed by a sputtering method on a polycarbonate substrate having pits and lands formed thereon, and then a light-transmitting layer of an ultraviolet curable resin was formed on the alloy film, forming a single-layer BD-ROM. With respect to the BD-ROM, the initial reflectance and initial jitter value, and further durability after the accelerated environmental test were measured by the methods described in the examples below. As a result, it was found that in order to realize a reflective film exhibiting suitable reflectance as a reflective film for an optical information recording medium (for example, BD-ROM) and exhibiting excellent reproduction stability, the film essentially contains Si and/or Ge and that in order to exhibit excellent durability for maintaining the characteristics even in long-term storage at a high temperature and high humidity, the film preferably further contains a refractory metal element and/or a rare-earth element, leading to the achievement of the present invention.

First, the matter that the reflective film according to the present invention contains Si and/or Ge is described. Several alloy elements to be contained in Al alloy films can be used for securing only suitable reflectance. However, it was found that in order to simultaneously achieve both characteristics of suitable reflectance and excellent reproduction stability, it is significantly effective to add, particularly, Si and/or Ge among the various alloy elements, leading to conceiving of the present invention. Although the reason why these elements effectively function is unknown, a conceivable reason is as follows: Since laser beam reflection/interference by pits is used for reproduction in the BD, the reflection behavior of the laser beam is considered to influence reproduction characteristics. In the present invention, the reflective film which influences the reflection behavior contains Si and/or Ge, and thus an optical constant of the reflective film is considered to be changed and optimized, resulting in the effective function to suppress an increase in the initial jitter value, i.e., to improve the reproduction stability.

In order to sufficiently exhibit the above-described function effect, it is necessary to add 5% or more of Si and/or Ge. With less than 5% of the element, the effect of sufficiently decreasing the jitter value is insufficient. The Si content is preferably 10% or more and more preferably 12% or more, and the Ge content is preferably 7% or more and more preferably 12% or more. On the other hand, the upper limit of the amount of each of the elements is 40%. This is because as the content of any one of Si and Ge is increased, the absorbance of the Al alloy film constituting the reflective film is increased, and the reflectance is relatively decreased, thereby failing to obtain signal intensity necessary for reproduction or to secure excellent reproduction stability due to an increase in the initial jitter value. From the viewpoint of balance between the reflectance and jitter value, the content of Si and/or Ge is preferably 30% or less, more preferably 25% or less, and still more preferably 17% or less.

Next, the matter that the reflective film according to the present invention contains a refractory metal element and/or a rare-earth element is described.

The refractory metal element is considered to contribute to grain refining of the reflective film. In an initial stage of film deposition by sputtering, the refractory metal element serves as a point of nucleation, thereby increasing a nuclear density. Therefore, the deposited film is considered to include fine crystal grains as compared with a film not containing a refractory metal. In addition, the rare-earth element makes the microstructure of the reflective film amorphous-like. Since the rare-earth element has a different atomic radius from Al, Al in the film is considered not to easily assemble a crystal lattice, thereby improving surface smoothness. Also, it is considered that even after the accelerated test, a change in the crystal structure (for example, coarsening of crystal grains) of the reflective film is suppressed, and consequently excellent durability is exhibited.

Examples of the refractory metal element include Ti, Fe, Mn, Ta, W, Mo, Cr, V, Zr, Nb, and Hf. Preferably, at least one element is selected from the group consisting of Ti, Fe, and Mn. The reason for preferably selecting at least one element from Ti, Fe, and Mn is that these elements are easy available and an Al alloy target can be easily produced by a melting method because of the melting points of about 1200° C. to 1700° C.

Examples of the rare-earth element include Nd, Y, Gd, La, and Dy. Among these, Nd and Y are preferred.

In order to sufficiently exhibit the above-described function effects, the refractory metal element and/or the rare-earth element is preferably contained at 0.7% or more, more preferably 0.8% or more. With less than 0.7% of the element, a change in the structure is not sufficiently suppressed, and after the accelerated environmental test, the jitter value tends to becomes significantly higher than the initial jitter value, thereby degrading durability. On the other hand, when the amount of the refractory metal element and/or the rare-earth element exceeds 5%, an optical constant of the Al alloy film is greatly changed, and thus the initial jitter value tends to increase, thereby degrading reproduction stability. Therefore, in the present invention, the refractory metal element and/or the rare-earth element is preferably contained at 5% or less, more preferably 2% or less.

The reflective film according to the present invention basically contains Si and/or Ge in the above-described range and, from the viewpoint of improvement in durability, preferably further contains the refractory metal element and/or the rare-earth element (preferably at least one element selected from the group consisting of Ti, Fe, and Mn) in the above-described range, the balance including Al and unavoidable impurities.

The reflective film according to the present invention preferably has a thickness of 15 nm or more. When the reflective film according to the present invention contains a predetermined amount of the refractory metal element and/or the rare-earth element from the viewpoint improvement in durability, the thickness is preferably 25 nm or more. This is because Al forms a transparent oxide film (Al oxide film) in air. The reflectance is easily decreased by a decrease in a substantially Al alloy portion with growth of the oxide film. The thickness is more preferably 30 nm or more. On the other hand, with the reflective film having an excessively large thickness, the deposition time is increased, increasing the manufacturing cost. Therefore, the thickness is preferably 100 nm or less from the viewpoint of productivity.

An optical information recording medium according to the present invention includes a reflective film composed of an Al-based alloy satisfying the above-described composition, regardless of the configuration of an optical disc to which the reflective film is applied. The reflective film according to the present invention can be preferably used as, for example, a reflective film 2 shown in FIG. 1 or a first reflective film 2A shown in FIG. 2. The other components (the types of a light-transmitting layer, a substrate etc.) in an optical disc are not particularly limited, and those in ordinary use can be used.

Figure 2:
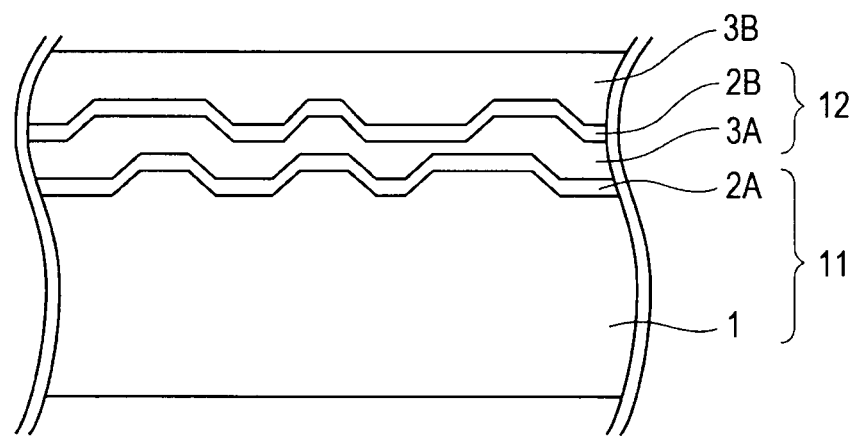
FIG. 2 is a sectional view schematically showing a principal portion of another read-only optical information recording medium (dual-layer optical disc) in the circumferential direction.

For example, as a substrate 1 shown in FIGS. 1 and 2, a resin widely used for optical disc substrates, specifically an ultraviolet curable resin, a polycarbonate resin, or an acrylic resin, can be used. In consideration of cost and mechanical characteristics, polycarbonate is preferably used.

The thickness of the substrate 1 is preferably in the range of about 0.4 to 1.2 mm. In addition, the depth of pits formed on the substrate 1 is preferably in the range of about 50 to 100 nm.

Also, the types of light-transmitting layers 3, 3A, and 3B shown in FIGS. 1 and 2 are not limited, and, for example, an ultraviolet curable resin, a polycarbonate resin, and the like can be used. In a single-layer optical disc, the thickness of the light-transmitting layer is preferably about 100 µm, while in a dual-layer optical disc, the thickness of the first light-transmitting layer 3A is preferably about 25 µm, and the thickness of the second light-transmitting layer 3B is preferably about 75 µm.

The reflective film according to the present invention can be formed by, for example, a sputtering method or a vapor deposition method, but the sputtering method is preferred. This is because the sputtering method is capable of forming a homogeneous film due to uniform dispersion of the alloy elements in an Al matrix, thereby achieving stable optical characteristics and durability.

Although the deposition conditions for sputtering are not particularly limited, for example, conditions given below are preferably used.

Substrate temperature: room temperature to 50° C.
Ultimate vacuum: $1\times10^{-5}$ Torr or less ($1\times10^{-3}$ Pa or less)
Gas pressure for deposition: 1 to 4 mTorr
DC sputtering power density (DC sputtering power per unit area of target): 1.0 to 20 W/cm$^2$ To form the reflective film according to the present invention by the sputtering method, the sputtering target used is an Al-based alloy sputtering target composed of an Al-based alloy containing 5% to 40% of Si and/or Ge and having substantially the same composition of a reflective film having a desired composition. In this case, the reflective film having the desired composition can be formed without deviation in the composition.

In addition, from the viewpoint of improvement in durability, the sputtering target is preferably composed of an Al-based alloy further containing 0.7% to 5% of a refractory metal element (for example, at least one element selected from the group consisting of Ti, Fe, Mn, Ta, W, Mo, Cr, V, Zr, Nb, and Hf) and/or a rare-earth element (for example, Nd and/or Y), and preferably at least one element selected from the group consisting of Ti, Fe, and Mn.

The sputtering target preferably has substantially the same composition as a reflective film having a desired composition. This is because by using the Al-based alloy sputtering target having substantially the same composition as a reflective film having a desired composition, a reflective film having a desired composition can be formed without deviation in the composition. Therefore, the composition etc. of the sputtering target are preferably the same as those of the reflective film.

The chemical composition of the Al-based alloy of the sputtering target according to the present invention is as described above, the balance including Al and unavoidable impurities.

The sputtering target can be produced by any method such as a melting-casting method, a powder sintering method, or a spray forming method.

EXAMPLES

Although the present invention is described in further detail below by way of examples, the present invention is not limited to these examples and, of course, can be carried out by adding proper modifications within a range applicable to the idea described above and below. Any one of the modifications is included in the technical scope of the present invention.

Example 1-1

First, a substrate having a thickness of 1.1 mm was formed by injection-molding polycarbonate using a Ni stamper having lands and pits. Then, a pure Al reflective film having a thickness or an Al-based alloy reflective film having each of the compositions shown in Table 1 was formed on the substrate by a DC magnetron sputtering method. To form the reflective film, a pure Al sputtering target, a composite sputtering target including a pure Al sputtering target and a pure metal chip disposed thereon for adding each of the alloys, or an Al-based alloy sputtering target was used.

As a sputtering apparatus, a multi-target sputtering apparatus capable of simultaneous discharge of plural targets (CS-200 manufactured by Ulvac Inc. or SIH-S100 manufactured by Ulvac Inc.) was used. The sputtering conditions included an Ar gas flow rate of 20 sccm, an Ar gas pressure of about 0.1 Pa, a DC sputtering power density of 2 to 5 W/cm$^2$, and a ultimate vacuum of $2.0 \times 10^{-5}$ Torr or less. The composition (Table 1) of each of the deposited Al-based alloy reflective films was determined by ICP emission spectroscopy, ICP mass spectrometry, or fluorescent X-ray analysis.

Next, an ultraviolet curable resin was applied in a thickness of 100 μm by a spin coating method on the reflective film formed as described above, and then cured by ultraviolet irradiation to form a light-transmitting layer. As a result, a single-layer BD-ROM having the reflective film with each of the compositions was formed.
(Measurement of Initial Jitter)

The initial jitter value was measured by adjusting a tilt and focus so that the jitter value was minimized under conditions below using ODU-1000 manufactured by Pulstec Co., Ltd. and TA-810 manufactured by Yokogawa Electric Corporation. The initial jitter value of 6.5% or less was regarded as acceptable.

Reproduction laser power: 0.35 mW

Disc rotational speed: 4.98 m/s (Measurement of Initial Reflectance)

The reflectance (disc reflectance) was calculated from the maximum level of reflected signals measured with a digital oscilloscope manufactured by Yokogawa Electric Corporation. The reflectance in the range of 40% or more and 75% or less was regarded as acceptable (suitable reflective film). The results are shown together in Table 1.

In Table 1, an example where both the initial jitter value and the initial reflectance are acceptable is determined as "A", and other examples are determined as "B".

TABLE 1

| No. | Composition of reflective film* | Thickness (nm) | Initial reflectance (%) | Initial jitter (%) | Determination |
|---|---|---|---|---|---|
| 1 | Al | 30 | 68.7 | 8.63 | B |
| 2 | Al—9.5Ag | 35 | 67.3 | 8.18 | B |
| 3 | Al—6.4Fe | 35 | 58.8 | 6.83 | B |
| 4 | Al—6.5Ni | 35 | 62.7 | 7.14 | B |
| 5 | Al—15Ti | 40 | 44.2 | 6.9 | B |
| 6 | Al—2.9Ge | 30 | 60.8 | 6.7 | B |
| 7 | Al—6.4Ge | 30 | 49.7 | 6.5 | A |
| 8 | Al—8.3Ge | 30 | 47.5 | 6.1 | A |
| 9 | Al—9.6Ge | 30 | 47.8 | 6.0 | A |
| 10 | Al—10.8Ge | 30 | 46.4 | 5.8 | A |
| 11 | Al—15.6Ge | 30 | 43.4 | 6.0 | A |
| 12 | Al—40Ge | 30 | 41.2 | 6.1 | A |
| 13 | Al—60.2Ge | 30 | 40.2 | 6.9 | B |
| 14 | Al—2.4Si | 30 | 66.1 | 8.5 | B |
| 15 | Al—6.6Si | 30 | 57.4 | 6.4 | A |
| 16 | Al—10.8Si | 30 | 54.2 | 5.9 | A |
| 17 | Al—14.9Si | 30 | 51.6 | 5.8 | A |
| 18 | Al—18.5Si | 30 | 48.9 | 5.9 | A |
| 19 | Al—22.7Si | 30 | 47.5 | 5.9 | A |
| 20 | Al—28.4Si | 30 | 45.4 | 5.8 | A |
| 21 | Al—37.9Si | 30 | 42.1 | 6.1 | A |
| 22 | Al—47.9Si | 30 | 39.9 | 6.4 | B |

*The numerical value indicates the content (atomic %) of each alloy component in the Al-based ally film.

The following consideration can be made from Table 1. That is, it is found that a reflective film composed of an Al-based alloy containing a specified amount of a component specified in the present invention shows initial reflectance in the specified range, a low initial jitter value, and excellent reproduction stability.

It is also found that a pure Al film, an Al-based alloy film not containing the component specified in the present invention, and a film containing the component specified in the present invention at a content out of the specified range show initial reflectance out of the specified range or a high initial jitter value and poor reproduction stability.

Specifically, No. 1 using a pure Al film and Nos. 2 to 5 not containing the specified element, Si and/or Ge, show high initial jitter values.

Nos. 6 and 14 which are examples containing the specified element show high initial jitter values because of the insufficient content of the element.

On the other hand, Nos. 13 and 22 which are examples containing the specified element show high initial jitter values or low initial reflectance because of the excessive content of the element.

Example 1-2

An Al-based alloy reflective film was formed and a single-layer BD-ROM was manufactured in the same manner as in Example 1-1 except that in Example 1-1, an Al-base alloy reflective film with the thickness and each of the compositions shown in Tables 2 and 3 was used in stead of the pure Al reflective film with the thickness shown in Table 1 or the Al-based alloy reflective film with each of the compositions shown in Table 1. In Examples 1-2, in addition of measurement of the initial jitter value and the initial disc reflectance, an accelerated environmental test was performed according to the procedures described below.
(Accelerated Environmental Test)

An accelerated environmental test (constant temperature humidity test) was performed by holding the BD-ROM having the reflective film formed thereon for 96 hours in an air atmosphere at a temperature of 80° C. and a relative humidity of 85% to measure the jitter value after the test and the reflectance after the test by the same method as described above. When a change in reflectance before and after the accelerated environmental test was within ±5%, and both the initial jitter value (jitter value before the accelerated environmental test) and the jitter value after the accelerated environmental test were 6.5% or less, durability was evaluated as "excellent". The results are shown together in Tables 2 and 3. In Table 2, Nos. 6 and 7 show immeasurable jitter values (96 h) after the accelerated environmental test. In each of the tables, "0h" indicates an initial value, and "96h" indicates a value after the accelerated environmental test.

In Tables 2 and 3, an example where all the initial jitter value, the initial reflectance, and the accelerated environmental test are acceptable is determined as "A", an example where the initial jitter value and the initial reflectance are acceptable is determined as "B", and other examples are determined as "C".

TABLE 2

| No. | Composition of reflective film* | Thickness nm | Jitter value (%) 0 h | Jitter value (%) 96 h | Disc reflectance (%) 0 h | Disc reflectance (%) 96 h | Change | Determination |
|---|---|---|---|---|---|---|---|---|
| 1 | Al—7.9Ge—0.7Ti | 35 | 6.15 | 6.16 | 56.4 | 55.7 | −0.7 | A |
| 2 | Al—7.4Ge—1.5Fe | 35 | 6.31 | 6.39 | 55.7 | 57 | 1.3 | A |
| 3 | Al—7.7Ge—2.7Mn | 35 | 6.43 | 6.27 | 55.1 | 54.7 | −0.4 | A |
| 4 | Al—17Si—1.6Fe | 35 | 6.11 | 6.08 | 50.2 | 49 | −1.3 | A |
| 5 | Al—17Si—2.5Mn | 35 | 6.18 | 6.31 | 52.5 | 48.8 | −3.7 | A |
| 6 | Al—18Si—0.5Ti | 35 | 5.94 | | 51.4 | 61.8 | 10.4 | B |
| 7 | Al—18Si—0.6Ti | 35 | 6.09 | | 51.9 | 59.1 | 7.2 | B |
| 8 | Al—18Si—0.8Ti | 35 | 5.89 | 6.2 | 50.5 | 50.4 | −0.1 | A |
| 9 | Al—18Si—0.9Ti | 35 | 5.95 | 5.92 | 50.4 | 49.8 | −0.6 | A |
| 10 | Al—18Si—1.3Ti | 35 | 6.05 | 5.91 | 50.5 | 49.9 | −0.6 | A |
| 11 | Al—18Si—1.9Ti | 35 | 5.92 | 5.97 | 50 | 49.1 | −0.9 | A |
| 12 | Al—19Si—2.4Ti | 35 | 5.97 | 6.14 | 50.4 | 49.1 | −1.4 | A |
| 13 | Al—20.4Si—4.8Ti | 35 | 6.21 | 6.45 | 52.3 | 47.5 | −4.8 | A |
| 14 | Al—19.9Si—10.3Ti | 35 | 6.71 | 6.82 | 50.2 | 47.3 | −2.8 | C |
| 15 | Al—20Si—19.2Ti | 35 | 6.93 | 6.92 | 42.2 | 41.2 | −1 | C |

*The numerical value indicates the content (atomic %) of each alloy component in the Al-based ally film.

TABLE 3

| No. | Composition of reflective film* | Thickness nm | Jitter value (%) 0 h | Jitter value (%) 96 h | Disc reflectance (%) 0 h | Disc reflectance (%) 96 h | Change | Determination |
|---|---|---|---|---|---|---|---|---|
| 16 | Al—20Si—1.0Ta | 35 | 6.04 | 5.89 | 49.7 | 47 | −2.73 | A |
| 17 | Al—20Si—1.0W | 35 | 5.89 | 5.87 | 49.2 | 47.1 | −2.09 | A |
| 18 | Al—20Si—1.0Mo | 35 | 5.94 | 5.9 | 48.9 | 45.8 | −3.09 | A |
| 19 | Al—20Si—1.0Cr | 35 | 5.91 | 5.97 | 50.9 | 48 | −2.91 | A |
| 20 | Al—20Si—1.0V | 35 | 5.97 | 5.97 | 49 | 45.5 | −3.45 | A |
| 21 | Al—20Si—1.0Zr | 35 | 5.93 | 5.94 | 49.4 | 47.3 | −2.09 | A |
| 22 | Al—20Si—1.0Nb | 35 | 6.02 | 5.82 | 47.6 | 46.2 | −1.36 | A |
| 23 | Al—20Si—1.0Hf | 35 | 6.02 | 5.93 | 49.2 | 46.7 | −2.50 | A |
| 24 | Al—20Si—1.0Nd | 35 | 6.3 | 5.77 | 48.6 | 46.7 | −1.91 | A |
| 25 | Al—20Si—1.0Y | 35 | 5.93 | 5.92 | 49.1 | 47.4 | −1.7 | A |

*The numerical value indicates the content (atomic %) of each alloy component in the Al-based ally film.

The following consideration can be made from Table 2. It is found that Nos. 1 to 5 each use the reflective film satisfying the defined composition and thus show suitable reflectance and excellent reproduction stability and durability. Nos. 6 to 15 are examples in which the Si amount in the Al—Si—Ti alloy reflective film is substantially constant, while the Ti amount is changed. It is also found that Nos. 6 and 7 each contain Si specified in the present invention in the specified amount, and thus show suitable reflectance and excellent reproduction stability. It is further found that Nos. 8 to 13 each further contain Ti in the amount specified in the present invention and can thus secure excellent durability, maintain a low jitter value, and decrease a change in reflectance. Further, Nos. 14 and 15 indicate that with an excessive amount of Ti, the initial jitter value is increased.

The following consideration can be made from Table 3. It is found that Nos. 16 to 25 each use the reflective film satisfying the specified composition and thus show suitable reflectance and excellent reproduction stability and durability.

Although this application is described in detail and with reference to the specified embodiments, it is of course obvious to persons skilled in the art that various modifications and corrections can be added without deviating from the spirit and scope of the present invention.

The present application is based on Japanese Patent Application (Japanese Patent Application No. 2009-098283) filed on Apr. 14, 2009 and Japanese Patent Application (Japanese Patent Application No. 2009-098284) filed on Apr. 14, 2009, the entire contents of which are hereby incorporated by reference.

INDUSTRIAL APPLICABILITY

According to the present invention, it is possible to realize a reflective film exhibiting suitable reflectance as a reflective film for an optical information recording medium (for example, BD-ROM) and excellent reproduction stability. Also, a reflective film exhibiting excellent durability for maintaining these characteristics even in long-term storage at a high temperature and high humidity can be realized by further adding a proper amount of at least one of a refractory metal element and a rare-earth element. Therefore, it is possible to provide a read-only optical information recording medium with suppressed manufacturing cost as compared with an optical information recording medium using a conventional Ag alloy for a reflective film. In particular, the optical information recording medium of the present invention is suitably used for an optical information recording medium such as BD-ROM which uses a blue laser for reproduction.

| Reference Signs List | |
|---|---|
| 1 | substrate |
| 2 | reflective film |
| 3 | light-transmitting layer |
| 2A | first reflective film |
| 2B | second reflective film |
| 3A | first light-transmitting layer |
| 3B | second light-transmitting layer |
| 11 | first information recording surface |
| 12 | second information recording surface |

The invention claimed is:

1. A read-only optical information recording medium comprising a reflective film, wherein the reflective film comprises an aluminum alloy comprising
aluminum,
5 to 40 atomic % of at least one of Si and Ge, and
0.7 to 5 atomic % of at least one of a refractory metal element and a rare-earth element, where the rare-earth element is at least one of Nd and Y.

2. The read-only optical information recording medium according to claim 1, wherein the refractory metal element is at least one element selected from the group consisting of Ti, Fe, Mn, Ta, W, Mo, Cr, V, Zr, Nb, and Hf.

3. The read-only optical information recording medium according to claim 1 or 2, having a structure in which the reflective film and a light-transmitting layer are laminated on a substrate, wherein information is reproduced with a blue laser.

4. A sputtering target for forming a reflective film, the target comprising an aluminum alloy comprising
aluminum,
5 to 40 atomic % of at least one of Si and Ge, and
0.7 to 5 atomic % of at least one of a refractory metal element and a rare-earth element, where the rare-earth element is at least one of Nd and Y.

5. The sputtering target according to claim 4, wherein the refractory metal element is at least one element selected from the group consisting of Ti, Fe, Mn, Ta, W, Mo, Cr, V, Zr, Nb, and Hf.

6. The read-only optical information recording medium according to claim 1, wherein the rare-earth element is Nd.

7. The read-only optical information recording medium according to claim 1, wherein the rare-earth element is Y.

8. The read-only optical information recording medium according to claim 1, wherein the aluminum alloy comprises 5 to 40 atomic % of Si.

9. The read-only optical information recording medium according to claim 1, wherein the aluminum alloy comprises 5 to 40 atomic % of Ge.

10. The read-only optical information recording medium according to claim 1, wherein the refractory metal element is at least one element selected from the group consisting of Ti, Fe, and Mn.

11. The read-only optical information recording medium according to claim 1, wherein the aluminum alloy comprises 0.8 to 2 atomic % of at least one of the refractory metal element and the rare-earth element.

12. The read-only optical information recording medium according to claim 1, wherein the reflective film has a thickness of from 15 to 100 nm.

13. The read-only optical information recording medium according to claim 1, wherein the reflective film has a thickness of from 25 to 100 nm.

14. The read-only optical information recording medium according to claim 1, wherein the reflective film has a thickness of from 30 to 100 nm.

15. The sputtering target according to claim 4, wherein the rare-earth element is Nd.

16. The sputtering target according to claim 4, wherein the rare-earth element is Y.

17. The sputtering target according to claim 4, wherein the aluminum alloy comprises 5 to 40 atomic % of Si.

18. The sputtering target according to claim 4, wherein the aluminum alloy comprises 5 to 40 atomic % of Ge.

19. The sputtering target according to claim 4, wherein the refractory metal element is at least one element selected from the group consisting of Ti, Fe, and Mn.

20. The sputtering target according to claim 4, wherein the aluminum alloy comprises 0.8 to 2 atomic % of at least one of the refractory metal element and the rare-earth element.

* * * * *